US008732448B2

(12) United States Patent
Khatri et al.

(10) Patent No.: US 8,732,448 B2
(45) Date of Patent: *May 20, 2014

(54) SYSTEM AND METHOD OF DELAYING POWER-UP OF AN INFORMATION HANDLING SYSTEM

(75) Inventors: Mukund P. Khatri, Austin, TX (US); Wayne R. Weilnau, Jr., Austin, TX (US); Richard L. Holmberg, Jr., Austin, TX (US); Akkiah C. Maddukuri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,999

(22) Filed: Jan. 16, 2012

(65) Prior Publication Data
US 2012/0173862 A1    Jul. 5, 2012

Related U.S. Application Data

(63) Continuation of application No. 12/136,420, filed on Jun. 10, 2008, now Pat. No. 8,122,235.

(51) Int. Cl.
*G06F 1/00* (2006.01)
(52) U.S. Cl.
USPC ............................... 713/2; 713/300; 713/323
(58) Field of Classification Search
CPC .............................. G06F 9/4406; G06F 9/4401
USPC ................... 713/300, 323; 725/150; 307/29
See application file for complete search history.

(56) References Cited

U.S. PATENT DOCUMENTS

| | | | |
|---|---|---|---|
| 5,881,361 A * | 3/1999 | Mannette et al. | 725/150 |
| 5,956,239 A | 9/1999 | Giacomini | |
| 6,661,123 B2 | 12/2003 | Hsu | |
| 6,903,583 B1 | 6/2005 | Habib et al. | |
| 6,968,465 B2 * | 11/2005 | Freevol et al. | 713/300 |
| 6,990,593 B2 * | 1/2006 | Nakagawa | 713/300 |
| 7,400,062 B2 * | 7/2008 | Pincu et al. | 307/29 |
| 7,934,107 B2 * | 4/2011 | Walrath | 713/300 |
| 2003/0237008 A1 | 12/2003 | Freevol et al. | |
| 2005/0172164 A1 | 8/2005 | Fox et al. | |
| 2005/0283624 A1 * | 12/2005 | Kumar et al. | 713/300 |
| 2006/0041757 A1 * | 2/2006 | Fang | 713/183 |
| 2006/0041767 A1 * | 2/2006 | Maxwell et al. | 713/323 |
| 2007/0180287 A1 | 8/2007 | Kumar et al. | |
| 2007/0271478 A1 | 11/2007 | Saputro et al. | |

* cited by examiner

*Primary Examiner* — Thomas Lee
*Assistant Examiner* — Aurel Prifti
(74) *Attorney, Agent, or Firm* — Larson Newman, LLP (57) ABSTRACT

A system and method of delaying power-up of an information handling system is disclosed. According to an aspect, a method of powering an information handling system can include detecting a delay power-up setting within a basic input output system (BIOS) of a particular information handling system using a management controller. The management controller can be configured to delay power-up of the particular information handling system. The method can further include enabling a power-up of the particular information handling system in response to the delay power-up setting using the management controller.

15 Claims, 4 Drawing Sheets

SYSTEM AND METHOD OF DELAYING POWER-UP OF AN INFORMATION HANDLING SYSTEM

CROSS REFERENCE TO RELATED APPLICATIONS

This application is a continuation of U.S. patent application Ser. No. 12/136,420, entitled "System and Method of Delaying Power-Up of an Information Handling System," filed on Jun. 10, 2008, the disclosure of which is hereby expressly incorporated by reference in its entirety.

FIELD OF THE DISCLOSURE

This disclosure relates generally to information handling systems, and more particularly to a system and method of delaying power-up of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the figures is provided to assist in understanding the teachings disclosed herein. The following discussion will focus on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect, a method of powering an information handling system is disclosed. The method can include detecting a delay power-up setting within a basic input output system (BIOS) of a particular information handling system using a management controller. The management controller can be configured to delay power-up of the particular information handling system. The method can further include enabling a power-up of the particular information handling system in response to the delay power-up setting using the management controller.

According to another aspect, a delay power-up system is disclosed. The delay power-up system can include a management controller configured to enable power-up of an information handling system. The delay power-up system can further include a power distribution circuit configurable to delay powering of the information handling system in response to the management controller detecting a delay power-up value within a BIOS of the information handling system.

According to a further aspect, an information handling system is disclosed. The information handling system can include a power distribution circuit operable to be enabled by a management controller, and a basic input output system (BIOS) configurable to include a delayed power-up value detectable by the management controller. The management controller can be configured to detect the delay power-up value and disable power-up in response to the delay power-up value.

Figure 1:
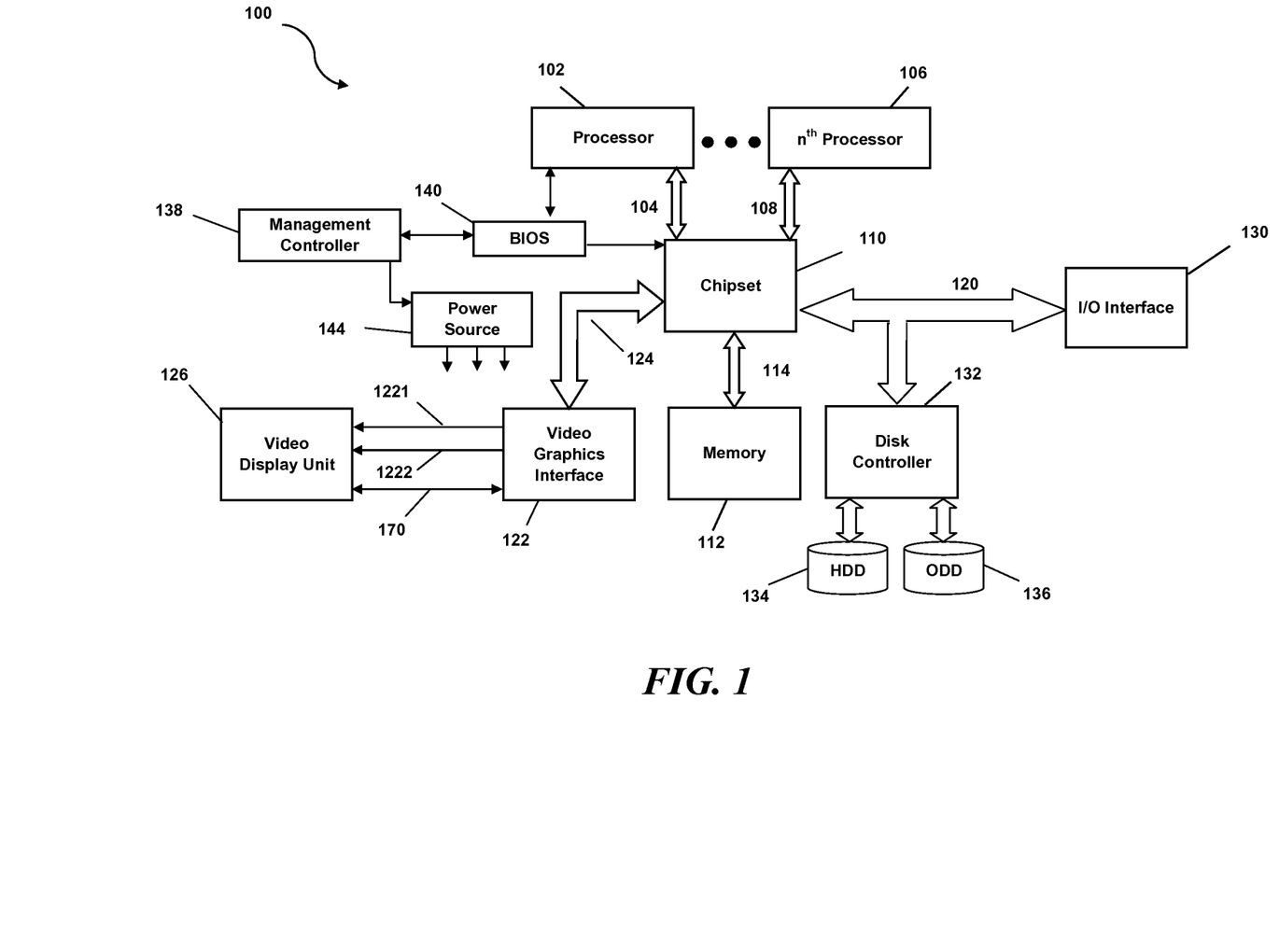
FIG. 1 illustrates a block diagram of an information handling system according to an aspect of the disclosure.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

In one form, the information handling system 100 can include a management controller 138 coupled to a BIOS 140 and the processor 102. The management controller 138 can monitor a power state of the information handling system 100. In one form, the management controller 138, the power source 144, or any combination thereof, can be provided as a part of the information handling system 100 or can be provided as a separately as desired. The management controller 138 can enable use of the power source 144 to power the information handling system 100, and can be located within or external (e.g. remote) to the information handling system 100.

During operation, the management controller 138 can detect when the information handling system 100, and can be powered using a delayed power sequence. For example, the management controller 138 can detect a last operating state of the information handling system 100, and can initiate a delayed powering of the information handling system 100 in various ways. For example, the BIOS 140 can include a delay power-up value entry such as "DISABLED," "DELAY," "NO DELAY," "RANDOM DELAY," "STAGGER DELAY," "DELAY TIME=10 SECONDS," or various other values and combinations thereof.

In particular form, a user can modify the BIOS 140 using a BIOS set-up menu of the information handling system 100. In another form, a delay power-up setting of the information handling system 100 can be established using a policy. For example, a policy can be communicated to the information handling system 100, and can be used to update BIOS settings of the information handling system 100.

In a further form, a delay power-up feature can be enabled within the BIOS 140, and a random time value can be generated to enable power-up. For example, the BIOS 140 can detect a random delay time value, and can disable the chipset 110 using a Power State=Off value. Upon expiration of the random delay time value, the management controller 138 can enable the power up by setting the Power State=On value. In other forms, the management controller 138 can also include a configuration set-up that can include one or more values that can be used.

Delaying power-up of the information handling system 100 can reduce power demands within a facility, data center, etc. configured to power multiple information handling systems. For example, the information handling system 100 can be set to power at a later time in the event of a power failure. As such, a power surge related to powering multiple information handling systems at the same time can be reduced without a user having to manually power-up each information handling system within a facility or data center.

Figure 2:
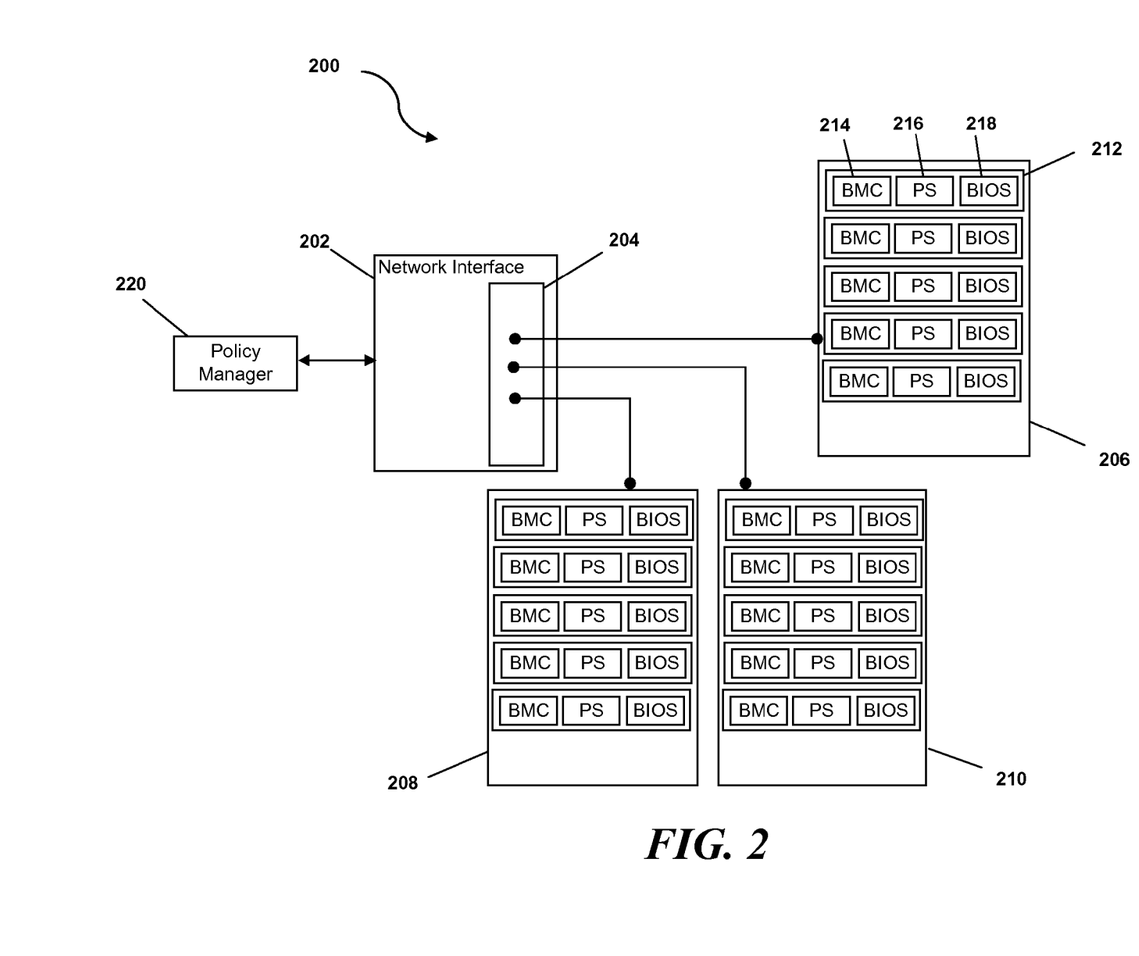
FIG. 2 illustrates a block diagram of a data center employing a delay power-up enabled information handling system according to an aspect of the disclosure.

FIG. 2 illustrates a block diagram of a data center employing a delay power-up enabled information handling system. A data center, generally illustrated at 200, can include a network interface including one or more access points configured to access a server rack 206, a server rack 208, and a server rack 210. Each server rack can include multiple servers 212. Each server 212 can include a base management controller (BMC)

214, a power supply 216, and a BIOS 218. Each server 212 can further be accessed by a policy manager 220 configured to publish a power-up delay policy to each of the server within the data center 200 as needed or desired.

During operation, the BMC 214 of each server 212 can detect a delayed power-up setting within each BIOS 218. For example, the BMC 214 of each server 212 can then determine whether to power-up each server or to delay power up of a respective server. If a particular server should be powered up in the event of a power loss, the respective server would not delay power up using a delay. If a particular server includes a delay setting that enables delay powering of the particular server, then the particular server would not power during a power loss. However, after a period of time elapses, the particular server with the delay power us setting would power up. In this manner, limited power requirements may be realized within the data center 200, and power surges that may be caused from powering up all servers at the same time can be reduced.

Figure 3:
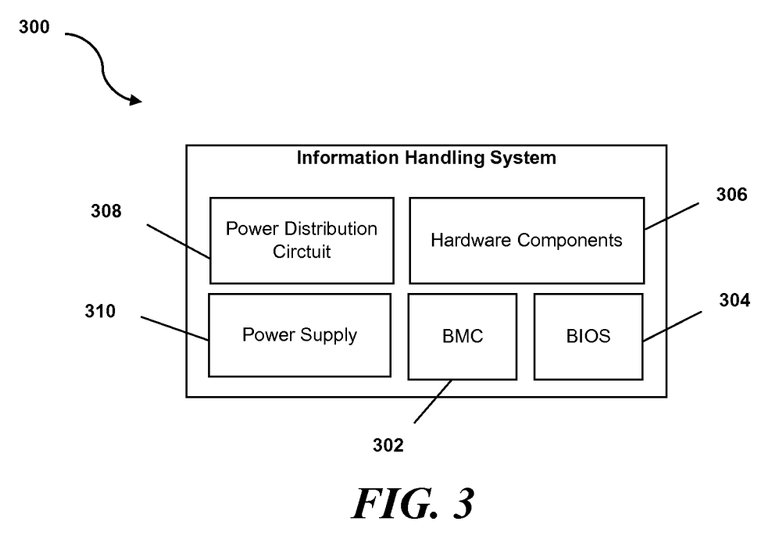
FIG. 3 illustrates a functional block diagram of an information handling system operable to employ a delay power-up power sequence according to an aspect of the disclosure.

FIG. 3 illustrates a functional block diagram of an information handling system operable to employ a delay power-up power sequence, generally illustrated at 300. The information handling system 300 can include a BMC 302, a BIOS 304 configurable to include one or more power-up enable settings, and hardware components 306. The information handling system 300 can further include a power distribution circuit 308, and a power supply 310. According to an aspect of the disclosure, the information handling system 300 can include various components and devices.

In one form, the BMC 302 can be used to delay power-up of the information handling system 300. For example, the BIOS 304 can include a set-up option that can be linked to, or associated with, system power recovery, power-up, system reset, or any combination thereof. The setting within the BIOS 304 can include a delay power-up setting value to disable or delay power-up of the information handling system 300. For example, if the delay power-up setting value is set to "DELAY," the information handling system 300 can be delayed during a power-up sequence. When the setting is set to a "DISABLED" or "NO DELAY" value, a default power-up value, or "NO DELAY" value can be used to power-up the system.

In another form, the delay power-up setting value can be set to a "RANDOM DELAY" value, and the BMC 302 can use a system identifier (not illustrated) of the information handling system 300 to determine a random delay value to delay power-up of the information handling system 300. For example, the BMC 302 can access a system identifier, such as a service tag, machine access code (MAC) address, ePPID, or another code or value that can uniquely identify the information handling system 300.

In another form, the BMC 304 can use pre-programmed delay or stagger values that can be programmed by a user or can be policy driven. For example, the delay power-up setting value can be set to a user specified delay value (e.g. two hundred milliseconds, five seconds, ten seconds, etc.) that can be programmed via a BIOS interface, published using a policy, etc. In another form, the BC 304 can use a random number generator as another source to determine a delay power-up value.

According to one aspect, the BMC 302 can be used as a centralized location to handling AC recovery of multiple information handling systems. Additional information handling systems (not illustrated) coupled to the BMC 302 can communicate AC recovery mode and delay power up setting value data to the BMC 302. For example, the BMC 304 can store power-up setting information that can be obtained during initialization of an information handling system. For example, during initialization of the information handling system 300, the BIOS 304 can send an AC recovery mode setting value (e.g. "always on," "always off," "retain last"), and a delayed power-up setting value, to the BMC 302. The BMC 302 can store the value, and upon initiating power-up of one or more of the information handling systems, the BMC 304 can access the settings to determine an AC recovery mode setting, delay power-up setting value data, last state information, or any combination thereof, to enable power-up of the one or more information handling systems.

In one form, the BMC 302 can also store state information, such as the "last state". For example, a "last state" value of the information handling system 300 can be detected by the BMC 302, and used in combination with a delay power-up setting value. For example, a delay of ten second can be programmed and upon the a ten second delay, the "last state" of the information handling system 300 can be used to power-up the information handling system 300.

In one form, as the information handling system 300 may reset of be powered-up, the BIOS 304 can program a processor/chipset (not illustrated) on AC recovery to an "always off" operating state. With the information handling system 300 in an "always off" operating state, the BMC 302 can detect whether to delay power-up of the information handling system 300. For example, as the information handling system 300 recovers from an AC power loss, the BIOS programs the processor/chipset to an "always off" state. The BMC 304 can detect a delay power-up setting stored within the memory 316 to be used to power the information handling system 300, and can power-up the information handling system 300 accordingly.

According to a particular aspect, a Stagger Mode field setting can be detected by the BMC 302 to power-up the information handling system 300. For example, the Stagger Mode field can be set to "AUTO," and the BMC 302 can employ an algorithm to calculate a random delay value to power-up the information handling system 300. For example, the information handling system 300 can include a unique value, such as a server tag identifier, a Local Area Network (LAN) on Motherboard Media Access Code Address (LOM MAC address), an electronic programmable parts identifier (ePPID) that can be unique per planar or server, Server Global Unique Identifier (GUID), or Trusted Platform Module Encryption Key (TPM's EK). The BMC 302 can use one or a combination of system identifiers to determine a delay time value. In one form, a byte-checksum, CRC hash, or other algorithm can also be used. Upon generating a delay value, and delay value can be used to generate a delay time value to delay power-up of the information handling system 300. The delay time value can be in seconds, multiples of seconds, or various other units.

Figure 4:
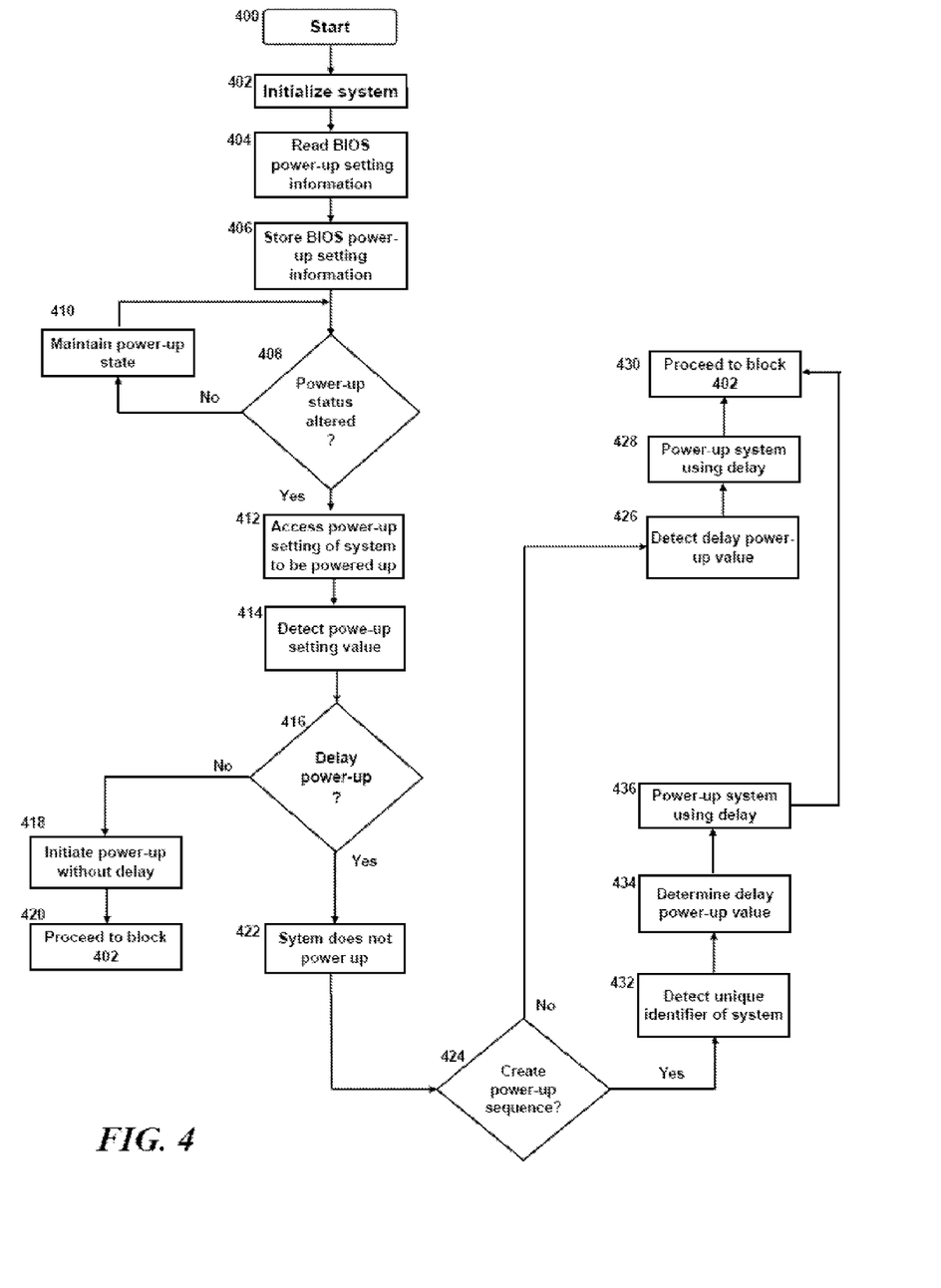
FIG. 4 illustrates a flow diagram of a method of delaying power-up of an information handling system according an aspect of the disclosure.

FIG. 4 illustrates a flow diagram of a method of delaying power-up of an information handling system according to one aspect of the disclosure. FIG. 4 can be employed in whole, or in part, by the information handling system 100 depicted in FIG. 1, the data center 200 described in FIG. 2, the system 300 illustrated in FIG. 3, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method begins generally at block 400. At block 402, an information handling system can be initialized and the method can proceed to block 404 and power-up setting information of the information handling system can be read from the BIOS. For example, power-up setting information can include one or more field settings to control power-up of the information handling system. For example, the power-up setting information can include delay power-up setting information such as "DISABLED," "DELAY," "NO DELAY," "RANDOM DELAY," "STAGGER DELAY," "DELAY TIME=10 SECONDS," or various other values and combinations thereof. The power-up setting information can also include other setting information such as an AC recovery mode setting values (e.g. "always on," "always off," "last state"). As such, the BIOS can include multiple power-up setting values that can be read. At block 406, the power-up setting information can be stored within a memory. For example, a management controller or base management controller operable to enable power-up of an information handling system can store the power-up setting information within a memory accessible to the management controller, such as a non-volatile random access memory (NVRAM) or other forms of non-volatile memory.

Upon storing power-up setting information, the method can proceed to decision block 408, and determines if a power-up status of an information handling system has been altered. For example, an information handling system can lose power, reset, or incur various other scenarios that may alter a power status of an information handling system. If the power-up status of the information handling system has not been altered, the method can proceed to block 410, and can maintain a current power-up state. The method can then proceed to decision block 408 and repeats.

If at decision block 408, a power-up status of an information handling system alters, the method can proceed to block 412 and a power-up setting of the information handling system to be powered-up can be accessed. For example, in one form, a management controller can be coupled to an information handling system and can access a BIOS of the information handling system to detect a power-up setting of the information handling system. In another embodiment, the management controller can access a memory that includes power-up setting of the information handling system. As such, the management controller can detect a power-up setting of the information handling system.

Upon accessing a power-up setting, the method can proceed to decision block 412 and detects a power-up setting value. For example, a power-up setting can include a delay power-up setting such as "DISABLED," "DELAY," "NO DELAY," "RANDOM DELAY," "STAGGER DELAY," "DELAY TIME=10 SECONDS," or various other values and combinations thereof that can be detected during a power-up of a system.

Upon detecting a power-up delay setting or absence thereof, the method can proceed to decision block 416 detects whether to delay power up of the information handling system using the delay power-up information. If at decision block 416 power-up should not be delayed, the method can proceed to block 418 and powers the information handling system. The method can the proceed to block 420 and repeats at 402.

If at decision block 416, a delay power-up setting value should be used to delay power-up of the information handling system, the method can then proceed to block 422 and the information handling system does not power up. The method can then proceed to decision block 424, and detects whether to create a power-up sequence. For example, multiple information handling systems may be powered-up. As such, the method can proceed to block 432, and detects a unique identifier of one or more systems. The method can then proceed to block 434, and determines a delay power-up value using the unique identifier. For example, a unique identifier of an information handling system can be detected. The unique identifier can be used to calculate a delay time value. In this manner, a unique delay time value of an information handling system can be determined to delay powering up. Various other techniques can also be used to determine a unique delay time value. In other forms, a delay power up sequence can be determined using a priority level (e.g. low, med, high). For example, an information handling system that may have high priority operation within a server rack or data center can include a high priority level and may be initialized earlier in a sequence than a system including a lower priority level.

Upon determining a unique delay time value, the method can proceed to block 436, and the information handling system can be powered using the delay.

If at decision block 424, a power sequence may not need to be created, the method can proceed to block 426 and the method can detect a delay power-up value of an information handling system to be powered up. For example, a delayed power-up value can be detected as a BIOS setting of an information handling system. In another form, a delay power-up value can be calculated using a unique identifier of then information handling system. Upon detecting a delay power-up value, the method can proceed to block 426, and the information handling system can be powered up using the delay power-up value. The method can then proceed to block 428 and repeats at block 402.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of powering an information handling system, comprising:
    detecting a delay power-up setting within a basic input output system (BIOS) of a particular information handling system using a management controller, wherein the management controller is configured to delay power-up of the particular information handling system based on the delay power-up setting;
    selecting an AC recovery mode setting value for one of a plurality of processors in the particular information handling system from an always on setting, an always off setting, and a retain last power setting, wherein the AC recovery mode setting value is selected for an individual processor of the plurality of processors, and the delay power-up setting is set for the particular information handling system including the plurality of processors;
    assigning the selected AC recovery mode setting value to the one of the plurality of processors;
    programming the one of the plurality of processors based on the AC recovery mode setting and a last state of the processor captured by the BIOS prior to a power loss of the information handling system, wherein a power state of the processor is programmed based on the AC recovery mode setting in response to the power loss; and
    enabling a power-up of the particular information handling system in response to the delay power-up setting using the management controller.

2. The method of claim 1, further comprising:
    detecting a delayed power-up value of the particular information handling system using the detected power-up setting;
    disabling the power-up delay of the particular information handling system when the delayed power-up value is disabled; and
    initiating the power-up of the particular information handling system after delaying the power-up of the particular information handling system.

3. The method of claim 1, further comprising:
    accessing a BIOS set-up option of the particular information handling system;
    detecting a delayed power-up field value within a BIOS set-up option field of the particular information handling systems;
    enabling modification of the delayed power-up field value; and
    updating the delay power-up field value.

4. The method of claim 3, further comprising:
    detecting the updated delay power-up field value in response to a power loss of the particular information handling system; and
    enabling power-up of the particular information handling system using the delay power-up field value and the management controller.

5. The method of claim 3, further comprising:
    receiving a policy including the delayed power-up field value;
    detecting power-up information within the policy; and
    updating the delayed power-up field value using the detected power-up information.

6. The method of claim 1, further comprising:
    detecting a random delay power-up value setting within a BIOS set-up option field, wherein the random delay power-up value setting is generated using a random number generator; and
    delaying power-up of the particular information handling system using the random delay power-up value setting.

7. The method of claim 1, further comprising:
    detecting a last operating state of the particular information handling system;
    storing the last operating state within a local memory of the management controller; and
    enabling a power-up of the particular information handling systems using the last operating state and the delay power-up setting.

8. The method of claim 1, wherein:
    disabling local power recovery capabilities of a chipset of the particular information handling system in response to the delay power-up setting; and
    enabling the local power recovery capabilities of the chipset after disabling the local power recovery.

9. The method of claim 1, further comprising:
    detecting a unique identifier of the information handling system;
    determining the delay power-up value using the unique identifier; and
    delaying initiating the power-up of the first information handling system using the determined delay value.

10. An information handling system comprising:
    a power distribution circuit operable to be enabled by a management controller;
    a basic input output system (BIOS) configurable to include a delayed power-up value detectable by the management controller, and to select an AC recovery mode value for a processor of a plurality of processors in the information handling system from an always on setting, an always off setting, and a retain last power setting, wherein a power state of the processor is programmed based on the AC recovery mode setting and in response to the power loss, wherein the AC recovery mode setting value is selected for an individual processor of the plurality of processors, and the delay power-up satin/is set for the information handling system including the plurality of processors; and
    wherein the management controller is configured to detect the delay power-up value and disable power-up in response to the delay power-up value.

11. The information handling system of claim 10, wherein: the delay power-up value of the BIOS set-up option is user configurable.

12. The information handling system of claim 10, wherein the delay power-up value includes a disable power-up value.

13. The information handling system of claim 10, further comprising:
    a chipset configured to be powered using the power distribution circuit; and
    a management controller configured to disable powering of the chipset in response to a delay power-up value of the BIOS.

14. The information handling system of claim 10, wherein the management controller is further configured to:
    detect a last operating state of the information handling system;

store the last operating state within a local memory of the management controller; and disable power-up using the delay power-up value;

enable power-up after disabling power-up; and using the last operating state during the power-up.

15. The information handling system of claim 14, wherein the delay power-up value is configurable to be updated by a policy.

\* \* \* \* \*